E. BROWN.
THRUST BEARING.
APPLICATION FILED NOV. 2, 1914.

1,354,949.

Patented Oct. 5, 1920.

2 SHEETS—SHEET 1.

Attest:

Inventor:
Eric Brown.

Attys.

E. BROWN.
THRUST BEARING.
APPLICATION FILED NOV. 2, 1914.

1,354,949.

Patented Oct. 5, 1920.
2 SHEETS—SHEET 2.

Attest:
E. M. Hamilton,
Bessie J. Bishop

Inventor:
Eric Brown.
by Spear, Middleton, Donaldson & Spear
Attys.

UNITED STATES PATENT OFFICE.

ERIC BROWN, OF BADEN, SWITZERLAND.

THRUST-BEARING.

1,354,949.    Specification of Letters Patent.    Patented Oct. 5, 1920.

Application filed November 2, 1914. Serial No. 869,969.

*To all whom it may concern:*

Be it known that I, ERIC BROWN, a subject of the King of Great Britain and Ireland, and residing at Bahnhofweg, Baden, Switzerland, have invented certain new and useful Improvements in and Relating to Thrust-Bearings, of which the following is a specification.

This invention relates to thrust bearings. This invention more especially relates to bearings for revolving shafts carrying great loads or revolving at high speeds or both.

The equal distribution of the load over the bearing surfaces forms one of the chief difficulties encountered in the design and construction of thrust bearings. This difficulty is increased if the uniform distribution of the load is to be effected independently of deviations of the shaft from its normal position.

It has heretofore been proposed in connection with thrust bearings to divide one of the surfaces sliding on each other, (for instance, the surface located opposite the thrust collar of the shaft) into a ring of blocks, and to mount each block in such a manner that a moderate rotary movement and consequently an automatic adjustment of the separate blocks is rendered possible accompanied by an efficient distribution of the lubricating oil between the surfaces which slide on one another permitting higher loads and greater speeds to be obtained.

The object of the invention is to provide a thrust bearing by which one is able still further to improve the distribution of the load or pressure, to increase the capacity of the bearing surface for adjusting itself automatically (for the purpose of obtaining uniform support at all points or for permitting a displacement of the shaft from its normal position or for both purposes simultaneously) as well as to obtain a simplified bearing.

This invention consists in a thrust bearing of which the bearing surface (no matter whether the same is divided or not) is bedded on steel balls or the like which are built up in a definite manner so that stresses are transmitted right along or around the bearing surfaces, the balls or the like forming frames or struts to which the stresses are communicated.

Several forms of carrying the invention into effect are shown by way of example in the accompanying drawings, in which:—

Figure 1:
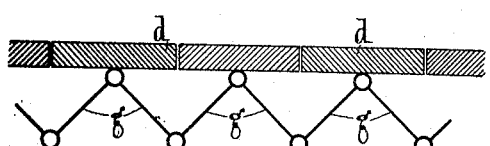
Figure 2:
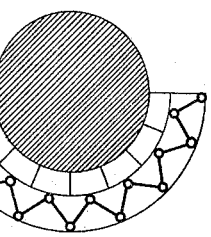
Figure 3:
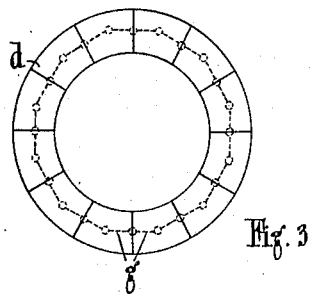

Figures 1 and 2 show diagrammatically for purposes of explanation an enlarged developed bearing and an ordinary journal bearing respectively;

Fig. 3 diagrammatically represents for explanation a collar thrust bearing.

Figure 4:
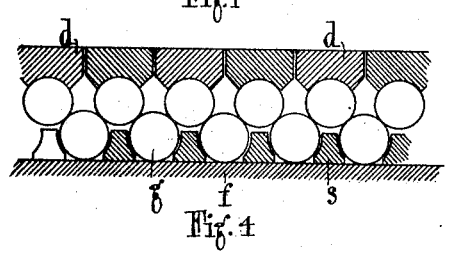
Figure 5:
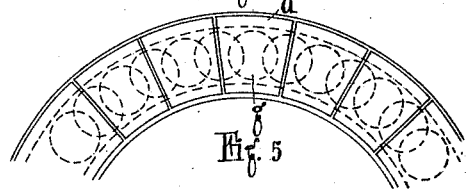

Figs. 4 and 5 show a further construction according to the invention;

Figs. 6 to 11 inclusive are six modifications;

Figs. 12 to 14, 15 to 17, 18 to 20 and 21 to 23, illustrate four further forms.

In Fig. 1 $d$ denotes the separate parts of a divided bearing surface of the bearing, whereas $f$ denotes the body of the bearing. Between the parts $d$ and the wall $f$ there is arranged the supporting device $g$. The latter in its diagrammatically illustrated fundamental form may be called a linking up or aggregation of strut frames. In this case, however, the supported bearing segment $d$ is not fixed at the ends; furthermore the abutments resting on the wall $f$ are not stationary, but are movable. If for instance, a segment $d$, owing say to a deviation of the shaft from the correct position (or through wear) is at the first moment subjected to a greater load than the other segments, then the pressure or thrust is immediately transmitted through the supporting elements in such a manner that a corresponding moving up of the remaining bearing members to the shaft and consequently a uniform distribution of the load over all the bearing members takes place.

The application for instance to an ordinary neck journal bearing as shown in Fig. 2, or to a collar thrust bearing provided with bearing surfaces for instance, such as are shown in Fig. 3 will therefore be self-explanatory.

From a constructive point of view many forms of carrying the invention into effect are possible, of which a few are shown in Figs. 4 to 23.

In Figs. 4 and 5 balls $g$ are used for transmitting the thrust. They are assembled in a regular order similar to the arrangement of Fig. 1.

To facilitate this systematic assembling when filling in the balls, distance pieces $s$ are arranged between the balls. Also the upper balls are mounted in bearing members $d$.

Figure 6:
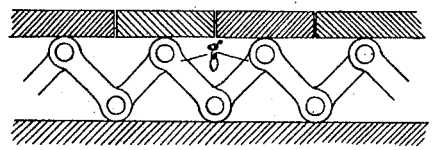

Fig. 6 shows a simple chain composed of links arranged in a zig-zag line, which chain serves as supporting and thrust transmitting or propagating elements.

Figure 7:
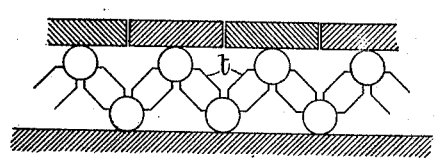
Figure 8:
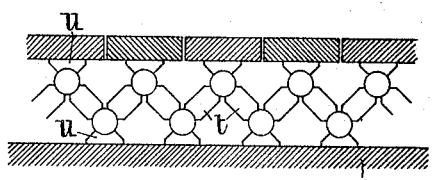

As shown in Figs. 7 and 8, the balls may alternate with supports $t$. Further the balls as shown in Fig. 8 may be mounted in special sliding shoes $u$. The shoes $u$ next to the bearing members $d$ may also be rigidly connected thereto so that only the shoes mounted on the wall $f$ slide.

Figure 10:
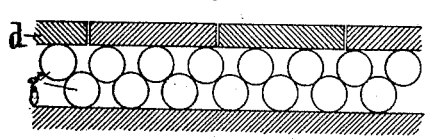
Figure 9:
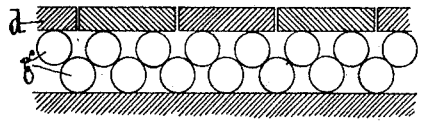

Figs. 9 and 10 show embodiments of the invention with several points of supports distributed if required in any desired manner, beneath a bearing member.

In Fig. 9 the bearing members $d$ are throughout supported by two balls, whereas those shown in Fig 10 are partly supported by two balls, and partly by three balls.

Figure 11:
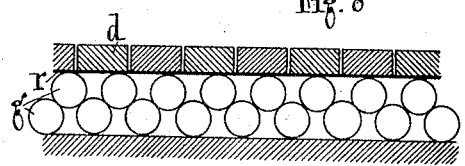
Figure 14:
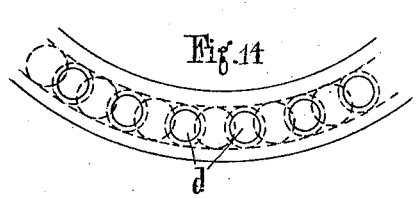

According to Fig. 11 an elastic covering plate $r$ is arranged between the bearing members and the balls, the arrangement of which balls beneath the bearing members may be as desired. According to this example the position of the points of support beneath the bearing members is empirical.

Figures 12, 13:
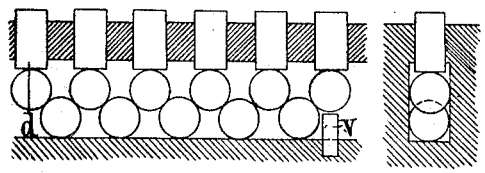

In Fig. 12 (development and longitudinal section respectively), 13 (cross section) and 14 (plan view), the bearing members $d$ take the form of round guided bolts, which rest direct on the balls. The pin $v$ serves for arresting or locking purposes, so that the building up of the balls is not disturbed.

Figure 15:
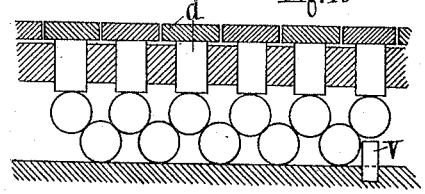
Figure 16:
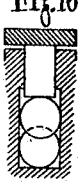
Figure 17:
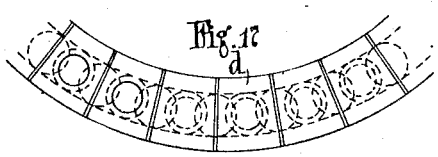

The example illustrated in the corresponding Figs. 15, 16 and 17 differs from the previous example only inasmuch as the bolts are combined with the segments to form the bearing members $d$.

Figure 18:
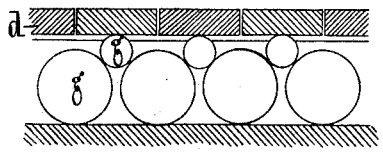
Figure 19:
Figure 20:
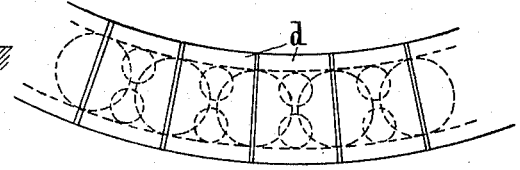

Figs. 18, 19 and 20 show the use of balls of different sizes. Two smaller balls are arranged in this example behind one another immediately beneath the bearing members $d$ and bear on considerably larger balls.

Figure 21:
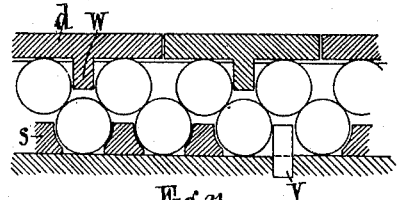
Figure 22:
Figure 23:
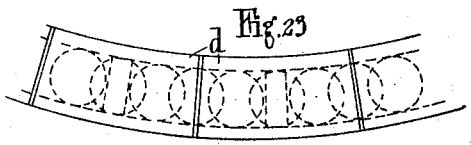

As shown in the forms illustrated in Figs. 21 to 23, long and narrow bearing members $d$ may, if desired, be provided with projections $w$ engaging between the upper balls.

Instead of balls, rollers or other rotational bodies may be selected.

Having now described my invention, what I claim as new and desire to secure by Letters Patent is:—

1. A bearing including a plurality of abutting bearing surfaces or segments, a solid wall housing having a continuous surface, rotational bodies in contact with said segments, and further rotational bodies in contact with said solid wall housing and with the first named rotational bodies.

2. A bearing including a plurality of bearing surfaces or segments, a solid wall surface or housing, rotational bodies in contact with said segments, and further rotational bodies in contact with said solid wall surface and with the first-named rotational bodies.

3. A bearing including a plurality of bearing surfaces or segments, a solid wall surface or housing, and rotational bodies arranged in zigzag fashion between said segments and said solid wall surface.

4. A bearing including a plurality of bearing surfaces or segments, a solid wall surface or housing, rotational bodies in contact with said segments, projections on said segments forming guiding means therefor and further rotational bodies in contact with said solid wall surface and with the first-named rotational bodies.

5. A bearing including a plurality of bearing surfaces or segments, a solid wall surface or housing, rotational bodies in contact with said segments, projections on said segments forming guiding means therefor, further rotational bodies in contact with said solid wall surface and with the first-named rotational bodies, and intermediate concave distance blocks situate between said further rotational bodies.

6. A bearing including a plurality of bearing surfaces or segments, a solid wall surface or housing, rotational bodies in contact with said segments, projections on said segments forming guiding means therefor, further rotational bodies in contact with said solid wall surface and with the first-named rotational bodies, intermediate concave distance blocks situate between said further rotational bodies, and a fixed projection on the wall surface for limiting the movement of the rotational bodies.

In testimony whereof, I affix my signature in presence of two witnesses.

ERIC BROWN.

Witnesses:
HERMANN EICHLER,
JOHANN BAARCH.